United States Patent [19]
Scanlon et al.

[11] Patent Number: 5,246,520
[45] Date of Patent: Sep. 21, 1993

[54] ONE STEP MOLDED CONTINUOUS FIBER REINFORCED PERFORATED COMPOSITE PANELS

[75] Inventors: John F. Scanlon, Bath; David M. Moorehouse, Laingsburg, both of Mich.

[73] Assignee: Auto-Air Composites, Inc., Lansing, Mich.

[21] Appl. No.: 653,900

[22] Filed: Feb. 12, 1991

[51] Int. Cl.[5] .................................. B32B 31/20
[52] U.S. Cl. ............................. 156/245; 156/252; 156/253
[58] Field of Search ................ 156/245, 252, 253; 264/154, 155, 156

[56] References Cited

U.S. PATENT DOCUMENTS 3,704,194 11/1972 Harrier .................................. 156/245
4,128,679 12/1978 Pohland ................................ 156/252

Primary Examiner—Caleb Weston
Attorney, Agent, or Firm—Robert E. Knechtel; Basil E. Demeur; Alan B. Samlan

[57] ABSTRACT

A continuous fiber reinforced composite panel and a one-step method of molding it using a high viscosity, thermoplastic matrix. The high viscosity, thermoplastic material is in the form of fibers and the fibers are commingled with reinforcing fibers producing a dry woven matte. The dry woven matte is placed in a mold and heated under pressure around a pin mandrel forming part of the mold. The method of forming the panels is a one-step method using a two-piece mold, one-half of which includes a pin mandrel having formed thereon a plurality of permanent die pins corresponding in number to the number of holes to be formed in the perforated composite panel. The other half of the mold has holes or cavities formed therein corresponding in number to the number of pins and into which these die pins are received when the mold is closed. The method simply is to place the dry woven matte over the die pins in the mold and to then close the mold. The mold is placed in a press and heat and pressure is applied to the mold. The mold then is allowed to cool and the pressure released. The perforated composite panel then is removed from the mold. Tougher perforated composite panels can be formed by interleaving in the mold the dry woven matte with film versions, or powder versions, of the same high viscosity thermoplastic material used in the matte.

19 Claims, 4 Drawing Sheets

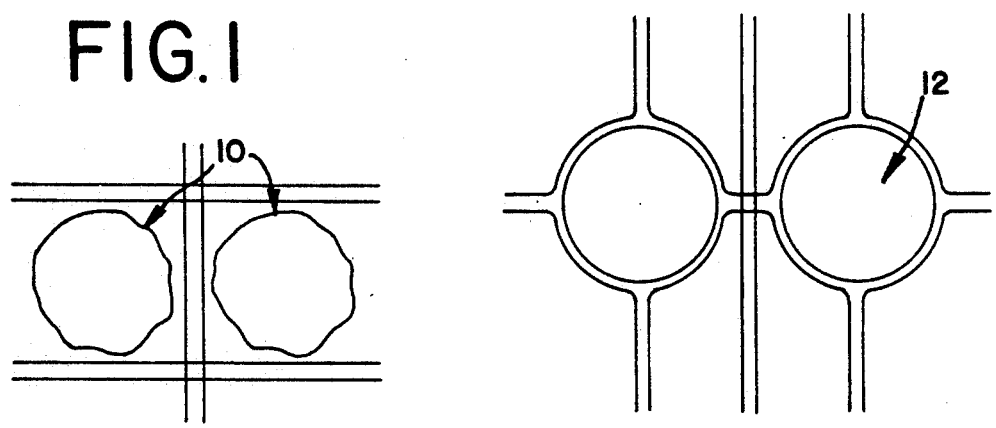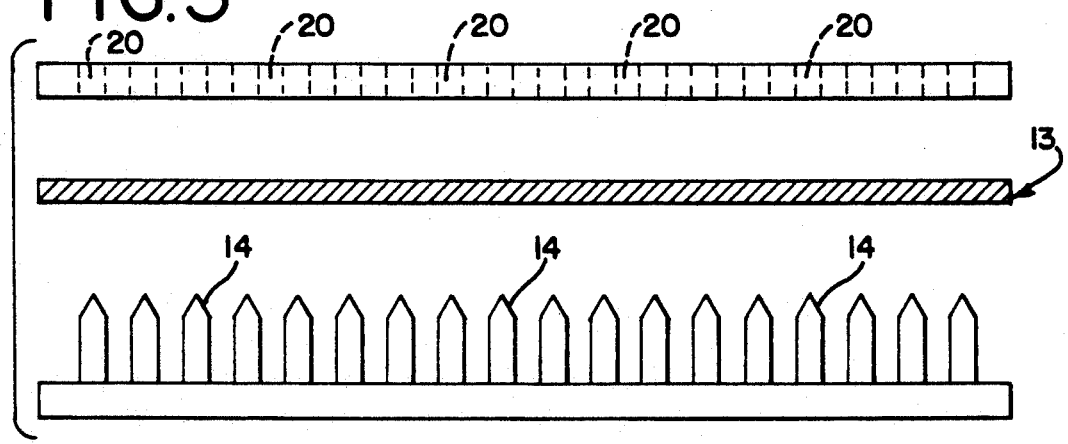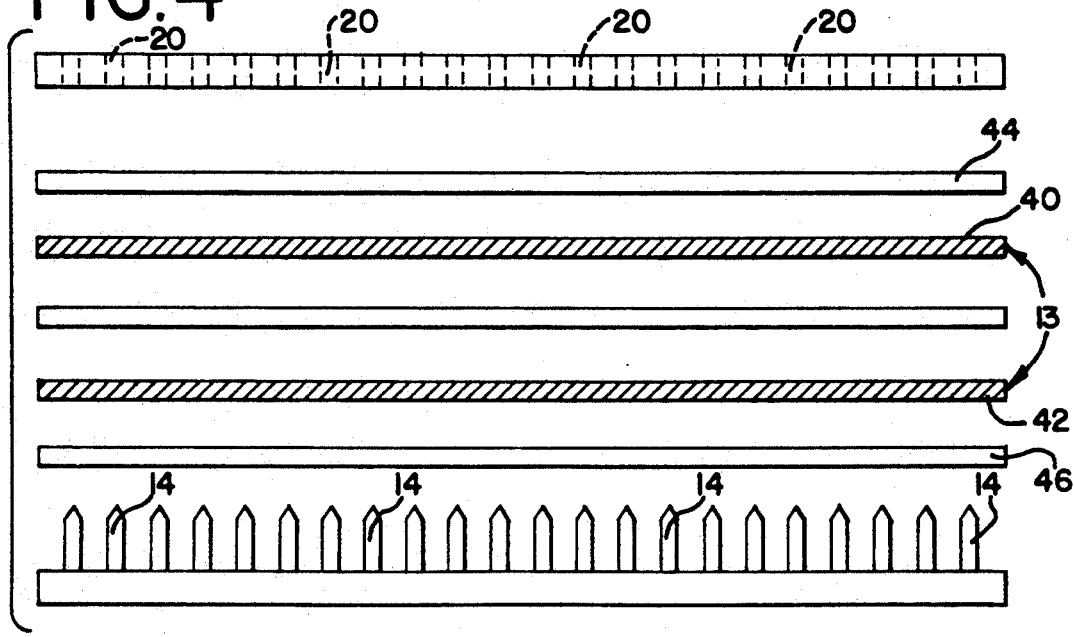

ONE STEP MOLDED CONTINUOUS FIBER REINFORCED PERFORATED COMPOSITE PANELS

BACKGROUND OF THE INVENTION

This invention relates generally to new and improved perforated composite panels, commonly called perforated face sheets, and to the method of molding them. More particularly, it relates to continuous fiber reinforced perforated composite panels and to the method of molding them.

Perforated panels of the type to which the invention pertains commonly are used for acoustic abatement in the gas turbine engine environment. In the past, these perforated panels have been made of aluminum because it is light and easily formed. However, aluminum has a weight in excess of what would be necessary using higher strength materials. Also, aluminum forms surface oxides which are difficult to bond to. Removal of the surface oxide through etching processes is costly and is very process-dependent.

Various efforts have been made to find a suitable substitute for the aluminum perforated face sheets, but to date none of the efforts have been entirely successful. One such effort consisted of a honeycomb core sandwich having one or more honeycomb cores. One such honeycomb core sandwich is described in U.S. Pat. No. 4,271,219.

In addition to the honeycomb core sandwiches, continuous fiber reinforced perforated composite panels have been fabricated to replace the aluminum face sheets. These perforated face sheets or composite panels have been fabricated using a thermoset matrix resin system. One of the major problems in fabricating these composite panels is the development of an efficient process for producing them. Generally, they have been formed over sacrificial plastic pins. Once the composite perforated face sheets have been consolidated over the sacrificial pins, the pins are broken and the composite is removed. Fabricating the composite panels in this fashion is expensive due to the multiple step processes necessary to form them. Also, the process does not always provide good uniformity of the face sheet hole penetrations. This is caused primarily to die lock of the panel on the sacrificial pins. Further still, the holes are non-uniform due to the fact that the matrix resin's viscosity lowers dramatically during the cure cycle, causing the area immediately around the sacrificial pin dies to become resin rich with resulting lack of continuous fibers in the localized area.

Another current method of fabricating perforated composite panels is to use a laser to cut individual holes through the solid laminate. This technique is likewise expensive since it takes approximately one and one-half seconds to cut each individual hole in the composite panel. Since there can be up to 25,000 individual holes in a panel, this technique is very inefficient. In addition, using a laser to cut the holes in a thermoset matrix fiber reinforced composite panel can cause substantial damage to both the matrix and the fiber in the localized area. These damaged areas are susceptible to moisture ingressions and crack propagation in long term fatigue conditions.

In another similar process, tows of composite materials are placed around the pins. This process also is expensive and still does not yield good fiber placement around the hole periphery.

OBJECTS OF THE INVENTION

Accordingly, it is an object of the invention to provide a new and improved continuous fiber reinforced perforated composite panel.

Further still, it is an object to provide a one step method for molding a continuous fiber reinforced perforated composite panel.

SUMMARY OF THE INVENTION

The above objects are accomplished in accordance with one embodiment of the invention by using a high viscosity, thermoplastic matrix, as opposed to a thermoset matrix resin system. The high viscosity, thermoplastic material is in the form of fibers and the fibers are commingled with reinforcing fibers producing a dry woven matte. The dry woven matte is placed in a mold and heated under pressure around a pin mandrel forming part of the mold. It is found that using the high viscosity, thermoplastic matrix material causes localized flow conditions which carry the continuous fiber reinforcement with the melted resin. As a result, the continuous fibers flow into intimate placement with edges of the holes formed around the die pins. Another result is that there are no resin rich areas immediately surrounding the holes as is commonly found and is a limitation of prior attempts at fabricating continuous fiber perforated panels.

The method of forming the panels is a one-step method using a two-piece mold, one-half of which includes a pin mandrel having formed thereon a plurality of permanent die pins corresponding in number to the number of holes to be formed in the perforated composite panel. The other half of the mold has holes or cavities formed therein corresponding in number to the number of pins and into which these die pins are received when the mold is closed. Generally, the method simply is to place the dry woven matte over the die pins in the mold and to then close the mold. Preferably and advantageously the mold first has applied to it a high temperature release agent such as Frekote 44. The mold is placed in a press and heat and pressure is applied to the mold. Generally, pressure within a range of 150–500 psi and heat within a range of 620°–800° F. is applied, depending upon the particular high viscosity, thermoplastic matrix used and the manufacturer's recommendations. The pressure and temperature is held for 20–60 minutes, depending upon the cure time of the particular thermoplastic matrix used. The mold then is allowed to cool and the pressure released. The perforated composite panel then is removed from the mold.

The flat perforated composite panel subsequently can be formed into a complex geometry by placing it in a forming tool and applying heat and pressure to the forming tool. Pressure is applied as required, and the panel is heated to a temperature which is just below the minimum melt temperature of the thermoplastic resin. The pressure and temperature is held for a period of time determined by the geometry, thickness and resin properties of the panel. After the heat is removed and the part allowed to cool, the pressure is released and the part removed.

Tougher perforated composite panels can be formed by interleaving in the mold the dry woven matte with film versions, or powder versions, of the same high viscosity thermoplastic material used in the matte. Also, the features of the panels, such as, the damping, flame resistance, electrical and thermal conductivity of the panels can be selectively tailored by employing fiber reinforcements such as ceramic, Kevlar or intercalated graphite, as described more fully below.

DESCRIPTION OF THE DRAWINGS

FIG. 1 generally illustrates the manner in which fibers consolidate around the holes in composite panels fabricated in accordance with the prior art;

FIG. 2 generally illustrates the manner in which the fibers are established in intimate placement with the edges of the holes formed in composite panels fabricated in accordance with the present invention;

FIG. 3 generally illustrates the manner in which a perforated composite panel is molded in accordance with the present invention;

FIG. 4 & 5 generally illustrate the manner in which a perforated composite panel is molded by interleaving dry woven mattes and film versions and powder version of thermoplastic material, respectively;

DETAILED DESCRIPTION

Figure 5:
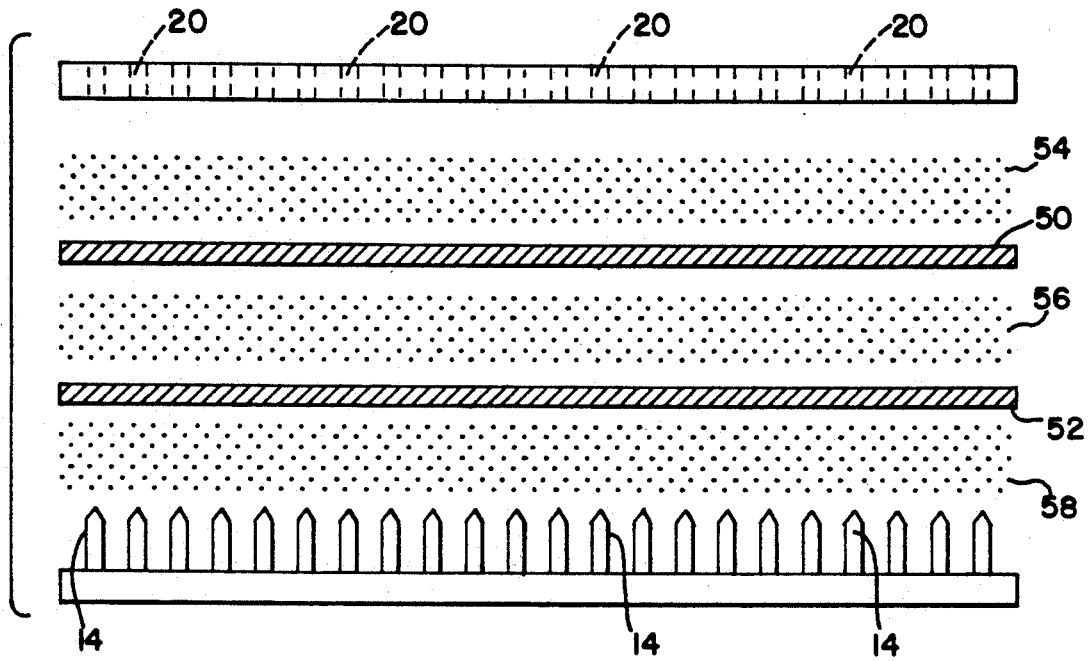

Referring now to the drawings, in FIG. 1 there is generally illustrated the manner in which the fibers consolidate around the holes in composite panels fabricated in accordance with prior art techniques. In FIG. 2, there is generally illustrated the manner in which the fibers are established in intimate placement with the edges of the holes formed in them when formed in accordance with the present invention. As indicated above, the prior perforated face sheets or composite panels have been fabricated using a thermoset matrix resin system, in conjunction with sacrificial plastic pins. The holes 10 in the perforated face sheets are non-uniform due to the fact that the viscosity of the matrix resins lowers dramatically during the cure cycle, causing the area immediately around the sacrificial pin dies to become resin rich with resulting lack of continuous fibers in the localized area, as illustrated. In contrast, the holes 12 which result in forming the perforated face sheets in accordance with the present invention using a high viscosity, thermoplastic material creates continuous fibers intimately placed with the edges of the holes 12. There are no resin rich areas immediately surrounding the holes. Accordingly, there is provided a good uniformity of the face sheet hole penetrations.

In FIG. 3, the manner in which a perforated composite panel is molded is generally illustrated. As stated above, fibers of a high viscosity thermoplastic matrix material are commingled with reinforcing fibers to produce a dry woven matte 13. The dry woven matte is placed in a two-piece mold, one-half of which includes a pin mandrel having formed thereon a plurality of permanent die pins 14 for forming the holes in the resulting perforated composite panel or laminate and one-half of which comprises a plurality of die pin cavities 20 corresponding in number to the die pins 14 for receiving therein the die pins 14 when the mold halves are closed. The mold is closed, placed in a press, and the matte is heated under pressure. Preferably and advantageously the mold has applied to it a high temperature release agent before the matte is placed in it. The release agent can be, for example, Frekote 44 or other release agents having the same or similar characteristics. The pressure and heat applied depends upon the particular thermoplastic resin used, and normally the pressure used is within a range of 150-500 psi and the temperature used is within a range of 620°-800° F. The cure time also depends upon the particular thermoplastic used, and normally the cure time is 20-60 minutes. When cured, the mold is allowed to cool, the pressure is released and the panel removed. Heating of the dry woven matte formed of fibers of high viscosity, thermoplastic materials commingled with reinforcing fibers causes localized flow conditions which carry the continuous fiber reinforcement with the melted resin. As discussed above, this phenomena creates the continuous intimate placement with edges of the holes formed around the die pins 14. There are no resin rich areas immediately surrounding the holes as is commonly found and is a limitation of the prior art attempts to form continuous fiber perforated panels.

In forming the perforated composite panel or laminate, fibers of high viscosity thermoplastic materials such as polyetheretherketone (PEEK), polyetherketoneetherketone (PEKEK), polyetherimide (PEI), or any other high viscosity thermoplastic material having the same or similar characteristics as the above mentioned are used. The reinforcing fibers used are carbon (graphite), Kevlar, glass (S2, E glass), or any other fiber having the same or similar characteristics as the above mentioned.

While a perforated composite panel or laminate can be successfully molded in the above-described manner, a much tougher perforated composite panel can be formed by molding the panels as illustrated in FIGS. 4 and 5. In FIG. 4, dry woven mattes 40 and 42 of commingled fibers of carbon and PEEK are placed in the mold and are interleaved with film versions 44, 46 of the same thermoplastic resin, PEEK in this case. The mold then is closed and heated under pressure until the material is cured. The mold then is allowed to cool, the pressure is released and the panel removed. In FIG. 5, dry woven mattes 50 and 52 of commingled fibers of carbon and PEEK are placed in the mold and are interleaved with layers of powdered PEEK 54, 56 & 58. The mold then is heated under pressure until the material cures, as just described, to form a panel. Molding the perforated composite panels in these fashions provide increased toughness and resistance compared to the panels molded as illustrated in FIG. 3 and the panels molded in accordance with prior methods of molding them.

Figure 6:
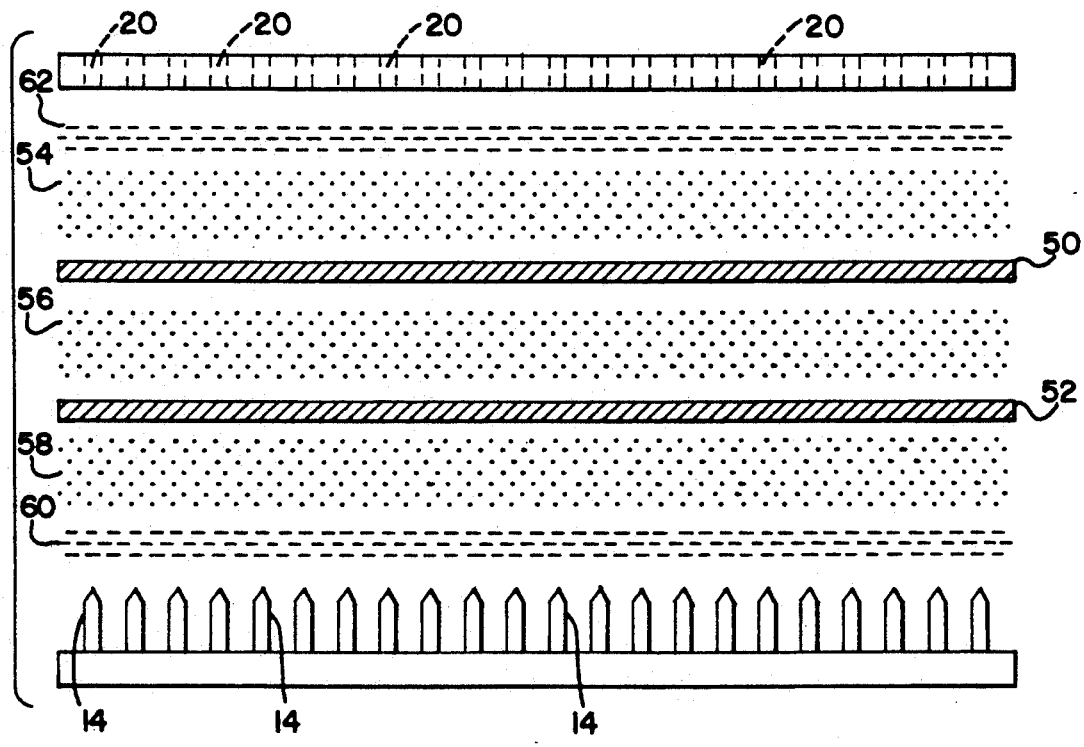
FIGS. 6 & 7 generally illustrate the manner in which a metal powder or screen is provided on a composite panel as a susceptor.
Figure 7:
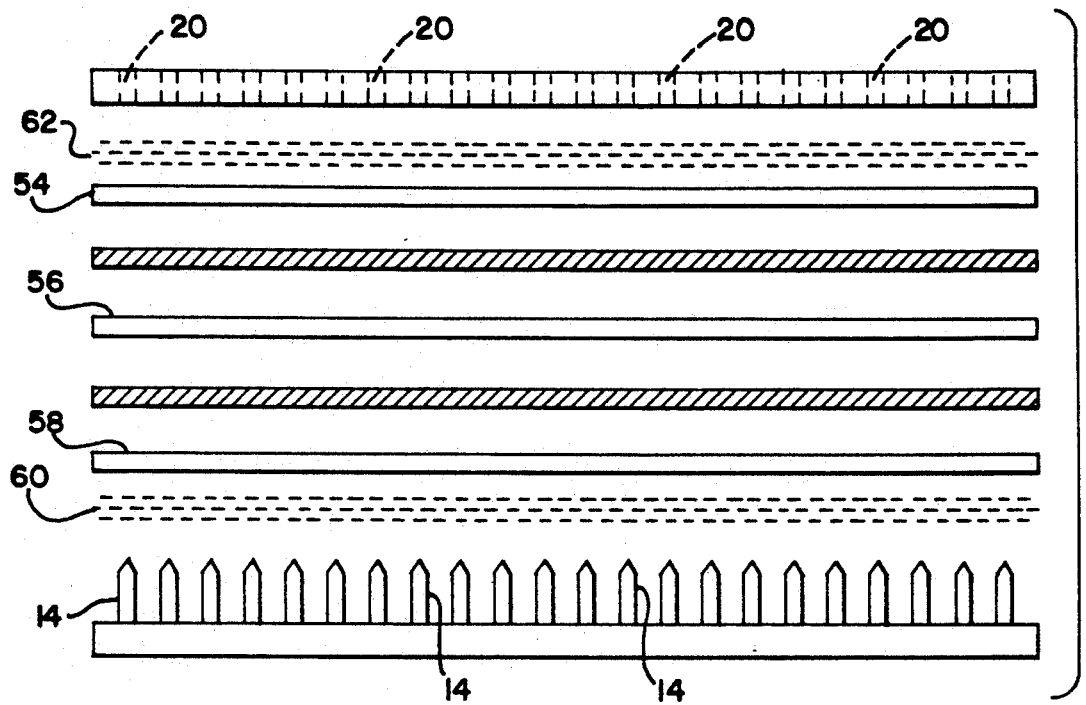

The perforated composite panels or face sheets also can be prepared so as to permit them to be easily fusion bonded to, for example, an underlying thermoplastic honeycomb. FIG. 6, in preparing the perforated panels or face sheets, they can be prepared in essentially the same fashion as described above and as illustrated in FIGS. 3, 4 and 5. In addition, however, a layer 60 of metallic flakes, powder or particles, or a metallic screen is first placed in the mold. The mattes of commingled fibers of thermoplastic and reinforcing fibers are interleaved with film or powder version of the same thermoplastic on top of the metallic flakes or screen, and then covered with another layer 62 of metal flakes or screen, as illustrated in FIGS. 6 and 7. The mold composition is then heated under pressure as described above to produce a perforated composite panel having thereon a metal powder or screen as a susceptor.

Figure 8:
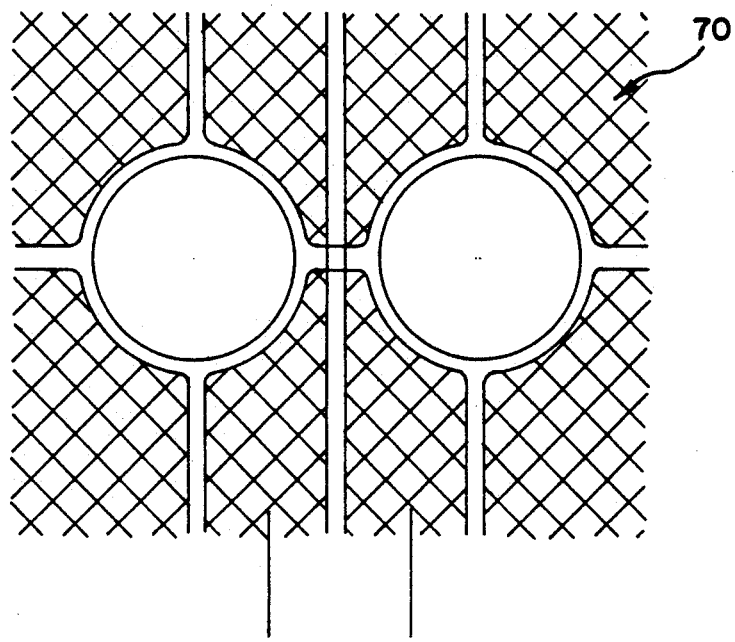
FIG. 8 generally illustrates the manner in which a resistance heater is embedded in a composite panel.

Further still, the perforated composite panels molded in accordance with the invention can be provided with anti and deicing features by embedding within them resistance heaters, as illustrated in FIG. 8. As illustrated, a wire mesh 70 of nichrome or other suitable material is interleaved with the fibers of thermoplastic, reinforcing fibers and film or power versions of the same thermoplastic. When molded under heat and pressure, a perforated composite panel having a resistance heater embedded therein is provided. When electrically energized, the resistance heaters provide anti and deicing to the panels.

From the above description, it can be seen that an improved perforated composite panel or face sheet is provided. More particularly, an improved one step method for molding the panels or sheets is disclosed. As a result of the disclosed method, composite panels having a number of different features are or can be provided or result. For example, the panels with the use of a thermoplastic such as PEEK will give off no toxic fume or smoke when exposed to up to 2000° F. flames; hence, enhanced flame resistance is provided in comparison to those of the prior art. The method also provides the ability to tailor thermal and electrical conductivity of the panels to meet user requirements through selective addition or subtraction of conducting reinforcing fibers. Further still, the panels have a high impact damage capability. Unlike typical thermoset composites, impact damage is visible on thermoplastic composites. This results from the fact that the panels absorb an impact and a dent remains in the panel face, rather than a resulting shattering of the rear side of the panel which normally is concealed, as usually results with panels molded using thermoset matrix resin systems. Generally, these features, as well as others, can selectively tailor the damping, flame resistance, electrical and thermal conductivity of the panels by employing fiber reinforcements such as ceramic, Kevlar or intercalated graphite.

Also, as indicated above, the perforated composite panels can be molded in a one-step molding process, as opposed to the multi-step processes used in the prior art. The panels are molded in a two-piece mold. One half of the mold includes a plurality of die pins which are permanently formed therein. The other half of the mold includes a plurality of cavities or holes corresponding in number to the number of die pins.

In molding a perforated composite panel, the mold preferably and advantageously first has a high temperature release agent applied to it. The release agent can be Frekote 44, or other release agent having the same or similar characteristics.

Thereafter, a dry woven matte of fibers of a high viscosity thermoplastic matrix material commingled with reinforcing fibers is placed on the die pins in the mold. The fibers of high viscosity thermoplastic matrix material can be polyetheretherketone, (PEEK), polyetherketoneetherketone (PEKEK), polyetherimide (PEI), or any other high viscosity thermoplastic material having the same or similar characteristics. The reinforcing fibers can be carbon (graphite), Kevlar, glass (S2, E glass), or any other fiber having the same or similar characteristics. The mold then is closed and placed in a press.

Pressure then is applied to the mold depending on the particular high viscosity thermoplastic resin being used and the manufacturer's recommendations. The pressure applied generally is in the range of 150–500 psi. The mold also is heated, again depending upon the thermoplastic and the manufacturer's recommendations. The temperature generally is in the range of 6200°–800° F., and the heat is applied generally for a range of 20–60 minutes, again depending on the cure time recommended by the manufacturer.

The heat is turned off after curing, and the mold allowed to cool. The pressure is removed, and the formed perforated composite panel is removed from the mold.

Figure 9:
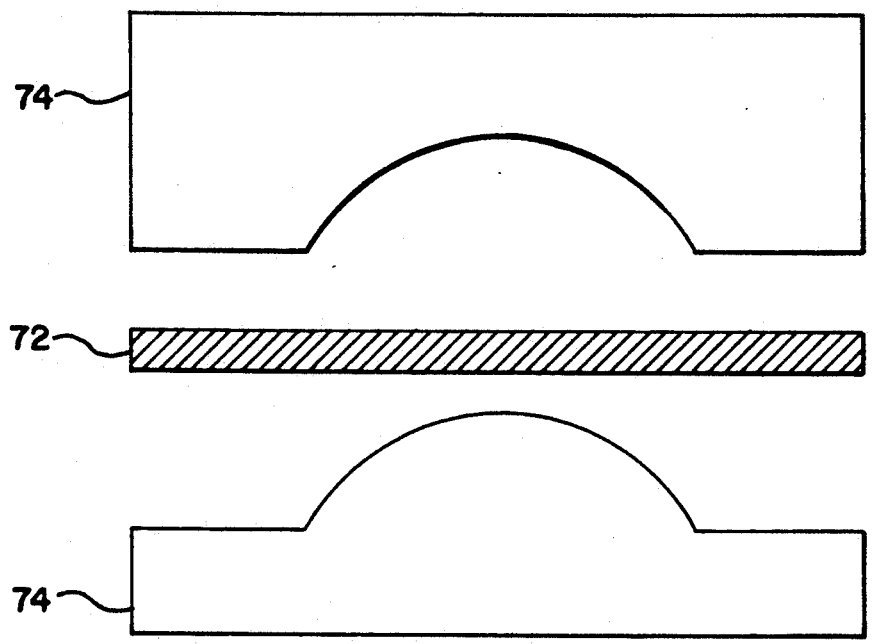
FIG. 9 generally illustrates the manner in which a flat perforate composite panel is subsequently formed into a complex geometry.

In FIG. 9, it is seen how a flat perforated composite panel 72 subsequently can be formed into a complex geometry. The panel 72 is placed in a forming tool 74 and applying heat and pressure to the forming tool. Pressure is applied as required, and the panel is heated to a temperature which is approximately equal to the minimum melt temperature of the thermoplastic resin. The pressure and temperature is held for a period of time determined by the geometry, thickness and resin properties of the panel. After the heat is removed and the part allowed to cool, the pressure is released and the part removed.

Figure 10:
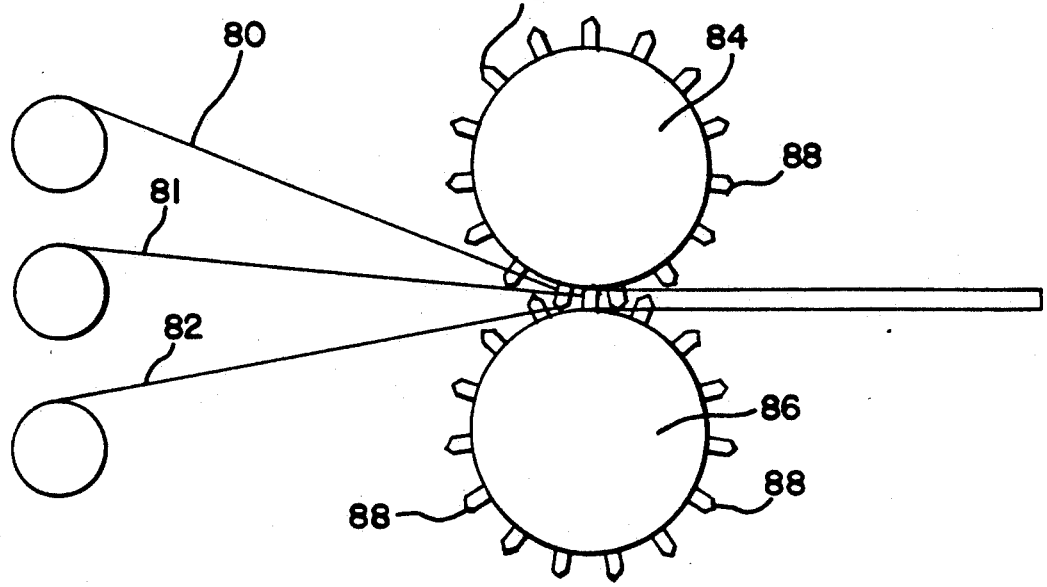
FIG. 10 illustrates another method of molding a continuous perforated composite panel.

In FIG. 10, there is illustrated still another one-step method of molding a continuous composite panel. In this case, continuous strips 80, 81 & 82 of high viscosity thermoplastic fibers commingled with reinforcing fibers is pulled through a set of heated drums 84, 86 having retractable die pins 88. The strips 80–82 may be interleaved with film or powder versions of thermoplastic (not shown). The drums 84, 86 are rotated at a speed to produce approximately 0.1–0.5 linear feet/minute and are heated such that the surfaces of the drums are well above the melt temperature of the thermoplastic resin. The pressure between the contact points of the drums is equivalent to 150–500 psi. The high temperature of the drums surfaces causes the viscosity of the resin to drop significantly and the pressure causes the fibers to be continuously wetted out by the resin in the vicinity of the contact point of the drums as the fabric is pulled through. The pins 88 retract after they pass through the contact point.

What is claimed is:

1. A method of molding a perforated composite panel comprising steps of:

providing a mold having therein a plurality of die pins and a plurality of cavities corresponding in number to the number of die pins in said mold for receiving therein said die pins when said mold is closed;

placing within said mold at least one dry matte woven of fibers of a high viscosity, thermoplastic material comingled with reinforcing fibers;

interleaving with said dry woven matte within said mold film versions of the same high viscosity, thermoplastic material from which said matte is woven;

closing said mold;

applying heat and pressure to said mold until the composition within said mold is cured;

allowing said mold to cool;

removing the pressure from said mold when it is cooled; and removing the formed perforated composite panel from said mold.

2. The method of claim 1, further comprising the steps of applying a layer of metallic material within said mold prior to placing therein said dry woven matte, interleaving with said dry woven matte at least one of a film version or a powdered version of the same high viscosity thermoplastic material from which said matte is woven, applying a lower of metallic material atop said interleaved dry woven matte and said film version or powdered version of the same high viscosity thermoplastic material from which said mate is woven.

3. The method of claim 1 further comprising the steps of interleaving with said dry woven matte and said film version of thermoplastic of the same high viscosity thermoplastic material from which said matte is woven an electrically conductive material.

4. The method of claim 1, wherein pressure within a range of 150 to 500 psi is applied to said mold.

5. The method of claim 1, wherein heat within a range of 620° to 800° F. is applied to said mold.

6. The method of claima 1, wherein heat and pressure is applied to said mold for a range of 20 to 60 minutes.

7. The method of claim 1, wherein said fibers of high viscosity, thermoplastic material comprises polyetheretheketone.

8. The method of claim 1, wherein said fibers of high viscosity, thermoplastic material comprises polyetherketoneetherketone.

9. The method of claim 1, wherein said fibers of high viscosity, thermoplastic material comprises polyetherimide.

10. The method of claim 1, wherein said fibers of high viscosity, thermoplastic material comprises at least one of the high viscosity thermoplastics polyetheretherketone, polyetherketoneetherketone or polyetherimide.

11. The method of claim 1, wherein said reinforcing fibers comprises at least one of the fibers carbon, kevlar or glass.

12. The method of claim 1, wherein said fibers of high viscosity, thermoplastic material comprises at least one of the high viscosity, thermoplastics polyetheretherketone, polyetherketoneetherketone or polyetherimide, and said reinforcing fibers comprises at least one of the fibers carbon, kevlar or glass.

13. The method of molding a perforated composite panel comprising steps of:
providing a mold having therein a plurality of die pins and a plurality of cavities corresponding in number to the number of die pins in said mold for receiving therein said die pins when said mold is closed;
placing within said mold at least one dry matte woven of fibers of a high viscosity, thermoplastic material commingled with reinforcing fibers;
interleaving with said dry woven matte within said mold powdered thermoplastic of the same high viscosity, thermoplastic material from which said matte is woven;
closing said mold;
applying heat and pressure to said mold until the composition within said mold is cured;
allowing said mold to cool;
removing the pressure from said mold when it is cooled; and
removing the formed perforated composite panel from said mold.

14. The method of claim 13 wherein pressure within a range of 150 to 500 psi and heat within a range of 620° to 800° F. is applied to said mold.

15. The method of claim 13, wherein said fibers of high viscosity, thermoplastic material comprises at lease one of the high viscosity thermoplastics polyetheretherketone, polyetherketoneetherketone or polyetherimide.

16. The method of claim 13, wherein said reinforcing fibers comprises at least one of the fibers carbon, kevlar or glass.

17. The method of claim 13, wherein said fibers of high viscosity, thermoplastic material comprises at least one of the high viscosity, thermoplastics polyetheretherketone, polyetherketoneetherketone or polyetherimide, and said reinforcing fibers comprises at least one of the fibers carbon, kevlar. or glass.

18. The method of claim 13, further comprising the steps of applying a layer of metallic material within said mold prior to placing therein said dry woven matte, interleaving with said dray woven matte at least one of a film version or a powdered version of the same high viscosity thermoplastic material from which said matter is woven, applying a layer of metallic material atop said interleaved dry woven matte and said film version or powdered version of the same high viscosity thermoplastic material from which said matte is woven.

19. The method of claim 13, further comprising the steps of interleaving with said dry woven matte and said film version of thermoplastic of the same high viscosity thermoplastic material from which said mattee is woven an electrically conductive material.

* * * * *